(12) United States Patent
Gilson

(10) Patent No.: US 12,451,154 B2
(45) Date of Patent: Oct. 21, 2025

(54) GENERATING AND/OR DISPLAYING SYNCHRONIZED CAPTIONS

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 258 days.

(21) Appl. No.: 16/058,505

(22) Filed: Aug. 8, 2018

(65) Prior Publication Data

US 2020/0051582 A1     Feb. 13, 2020

(51) Int. Cl.

| | |
|---|---|
| G10L 21/055 | (2013.01) |
| G10L 15/02 | (2006.01) |
| G10L 15/22 | (2006.01) |
| G10L 15/26 | (2006.01) |
| H04N 21/43 | (2011.01) |
| H04N 21/439 | (2011.01) |
| H04N 21/488 | (2011.01) |

(52) U.S. Cl.
CPC ............ G10L 21/055 (2013.01); G10L 15/02 (2013.01); G10L 15/22 (2013.01); G10L 15/26 (2013.01); H04N 21/43074 (2020.08); H04N 21/4394 (2013.01); H04N 21/4884 (2013.01); *G10L 2015/025* (2013.01)

(58) Field of Classification Search
CPC ....... G10L 15/26; G10L 15/265; G10L 25/57; G10L 17/005; G10L 25/48; G10L 17/00; G10L 2015/025; G10L 21/055; G10L 21/10

USPC ........................................................ 704/235
See application file for complete search history.

(56) References Cited

U.S. PATENT DOCUMENTS

| 2011/0239119 | A1* | 9/2011 | Phillips ................. G06F 3/0482 715/731 |
| 2014/0304019 | A1* | 10/2014 | Scott ................... G06Q 10/0633 705/7.15 |
| 2016/0372107 | A1* | 12/2016 | Dow ..................... G06F 16/685 |

(Continued)

OTHER PUBLICATIONS

Melanson, Don. "Google Glass Can Now Add Closed Captioning to the World As." Motherboard, Vice, Oct. 4, 2014, motherboard.vice.com/en_us/article/kbzgw3/google-glass-is-now-capable-of-real-time-closed-captioning. retrieved Aug. 7, 2018.

(Continued)

*Primary Examiner* — Richemond Dorvil
*Assistant Examiner* — Rodrigo A Chavez
(74) *Attorney, Agent, or Firm* — Banner & Witcoff, Ltd.

(57) ABSTRACT

Methods, apparatuses, and systems are described for correlating automatically-generated timing information from a first audio transcript with a second audio transcript (such as a transcript generated by one or more human transcribers) that may not have timing information. By correlating the second transcript with the timing information, an accurate and synchronized transcript may be generated. To correlate the second transcript with the timing information, a first transcript that contains the timing information may be automatically generated, and words of the first transcript may be compared to words of the second transcript. Based on the comparison, the timing information of the first transcript can be associated with the words of the second transcript.

24 Claims, 9 Drawing Sheets

(56) References Cited

U.S. PATENT DOCUMENTS

2017/0040017 A1* 2/2017 Matthews ............... G10L 25/57
2018/0198732 A1* 7/2018 Karthikeyan ......... H04L 47/724
2018/0358052 A1* 12/2018 Miller .................... G11B 27/10
2019/0087870 A1* 3/2019 Gardyne ................ G11B 27/10

OTHER PUBLICATIONS

Automatic Sync Technologies, LLC , CaptionSync by Automatic Sync Technologies, "How to Caption with CaptionSync", Copyright 2014, first accessed Jun. 6, 2017, https://web.archive.org/web/*/http://www.automaticsync.com/captionsync/learn/how-to-caption/ retrieved Aug. 7, 2018.

Tsui-Ping Desalvo, "Augmented reality Head Mounted Display for viewing Closed Captioned and/or subtitled streams" Copyright 2011, Sony Electronics Inc. https://priorart.ip.com/IPCOM/000207866 retrieved Aug. 7, 2018.

* cited by examiner

GENERATING AND/OR DISPLAYING SYNCHRONIZED CAPTIONS

BACKGROUND

Techniques for generating caption data for video and other content, especially live content, often rely on human transcribers. Human transcribers may be more accurate than automated techniques. But human transcribers, and some automated transcription techniques, generally do not generate accurate timing information that synchronizes the generated captions to the audio. As a result, captions are often displayed out of synchronization with corresponding audio. By contrast, certain automated techniques may be able to generate accurate timing information, but may be less accurate than human operators or other automated techniques.

SUMMARY

The following summary is not intended to identify key or critical elements of the disclosure nor to delineate the scope of the disclosure. The following summary merely presents some concepts of the disclosure in a simplified form as a prelude to the description below.

Automatically-generated timing information from a first audio transcript may be correlated with a second audio transcript (such as a transcript generated by one or more human transcribers) that may not have timing information. By correlating the second transcript with the timing information, an accurate and synchronized transcript may be generated. To correlate the second transcript with the timing information, a first transcript that contains the timing information may be automatically generated, and words of the first transcript may be compared to words of the second transcript. Based on the comparison, the timing information of the first transcript can be associated with the words of the second transcript.

The accuracy of a transcript may be improved by using multiple transcribers. Multiple human and/or automatic transcriptions may be compared to determine a most accurate transcript.

A particular location within video or other content may be used to display captions. Captions may be displayed nearby an associated speaker or other source of audio. For virtual reality content, video games, and other content with an interactive field of view, display devices may display indicators that a caption location is offscreen.

BRIEF DESCRIPTION OF THE DRAWINGS

The present disclosure is accompanied by figures in which like reference numerals indicate similar elements and in which.

DETAILED DESCRIPTION

In the following description, reference is made to the accompanying drawings, which form a part hereof. It is to be understood that structural and functional modifications may be made without departing from the scope of the present disclosure.

Figure 1:
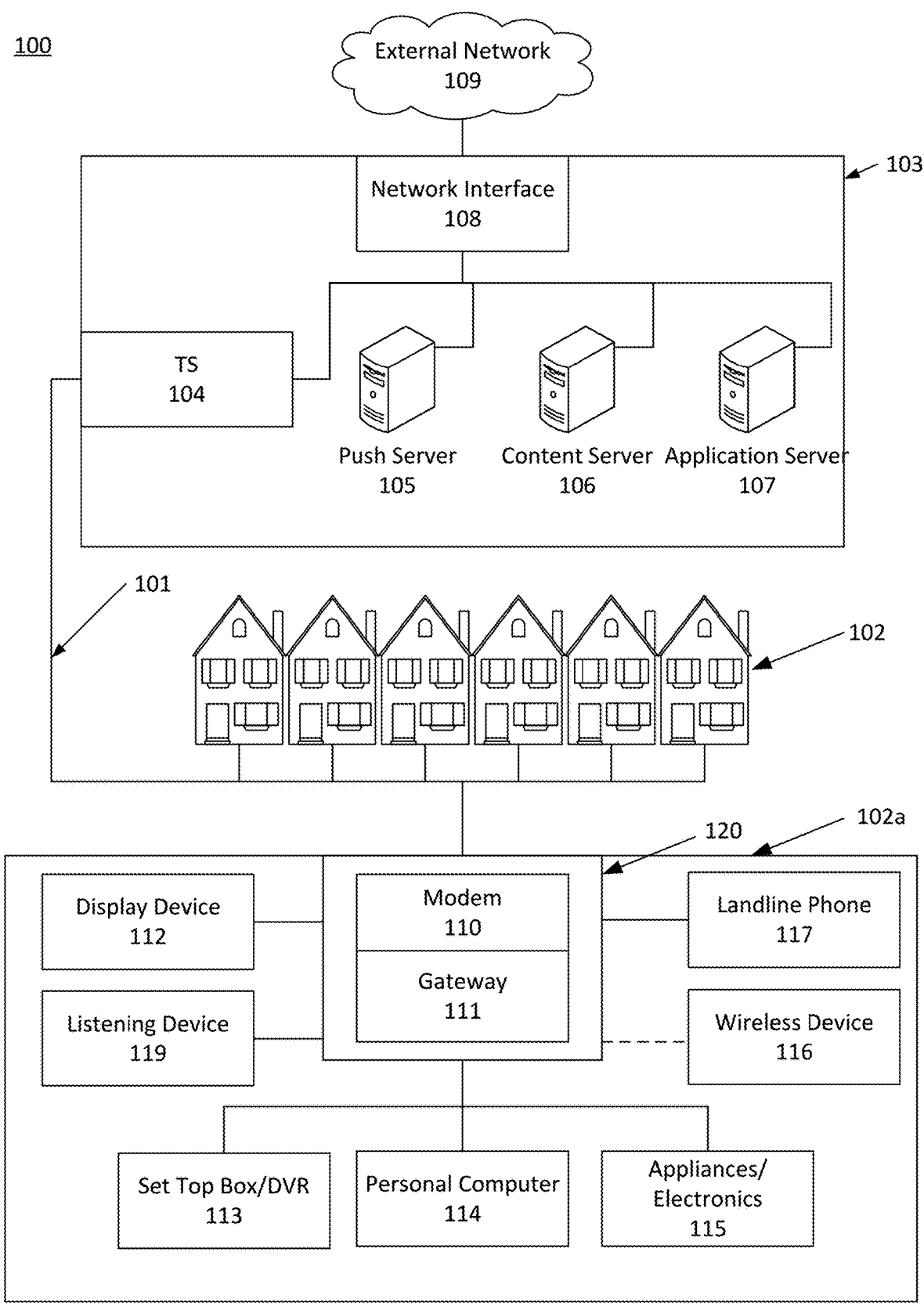
FIG. 1 shows an example network.

FIG. 1 shows an example network 100 on which many of the various features described herein may be implemented. The network 100 may be any type of information distribution network, such as satellite, telephone, cellular, wireless, optical fiber network, coaxial cable network, and/or a hybrid fiber/coax (HFC) distribution network. Additionally, the network 100 may be a combination of networks. The network 100 may use a series of interconnected communication links 101 (e.g., coaxial cables, optical fibers, wireless, etc.) and/or some other network (e.g., the Internet) to connect an end-point to a local office or headend 103. End-points are shown in FIG. 1 as premises 102 (e.g., businesses, homes, consumer dwellings, etc.). The local office 103 (e.g., a data processing and/or distribution facility) may transmit information signals onto the links 101, and the premises 102 may have a receiver used to receive and process those signals.

The local office 103 may include a termination system (TS) 104, such as a cable modem termination system (CMTS) in a HFC network, a cellular base station in a cellular network, or some other computing device configured to manage communications between devices on the network of links 101 and backend devices such as servers 105-107 (which may be physical servers and/or virtual servers in a cloud environment). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The local office 103 may also include one or more network interfaces 108, which can permit the local office 103 to communicate with various other external networks 109. These networks 109 may include networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

Servers 105-107 may be configured to perform various functions. The servers may be physical servers and/or virtual servers. The local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems. An application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.). An application server may implement, either alone or in combination with one or more other operations such as those described above, one or more techniques for generating and/or synchronizing caption data, as further described herein.

A premises 102a may include an interface 120. The interface 120 may comprise a modem 110, which may include transmitters and receivers used to communicate on the links 101 and with the local office 103. The modem 110 may be a coaxial cable modem (for coaxial cable links 101), a fiber interface node (for fiber optic links 101), or any other desired device offering similar functionality. The interface 120 may also comprise a gateway 111. The modem 110 may be connected to, or be a part of, the gateway 111. The gateway 111 may be a computing device that communicates with the modem 110 to allow one or more other devices in the premises to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the premises, such as display devices 112 (e.g., televisions), additional STBs 113, personal computers 114, laptop computers 115, wireless devices 116 (wireless laptops and netbooks, mobile phones, mobile televisions, personal digital assistants (PDA), etc.), a landline phone 117, and any other desired devices. Local network interfaces that gateway 111 may operate include, without limitation, Multimedia Over Coax Alliance (MoCA) interfaces, Ethernet interfaces, universal serial bus (USB) interfaces, wireless interfaces (e.g., IEEE 802.11), BLUETOOTH® interfaces (including BLUETOOTH® LE), and ZIGBEE®.

Figure 2:
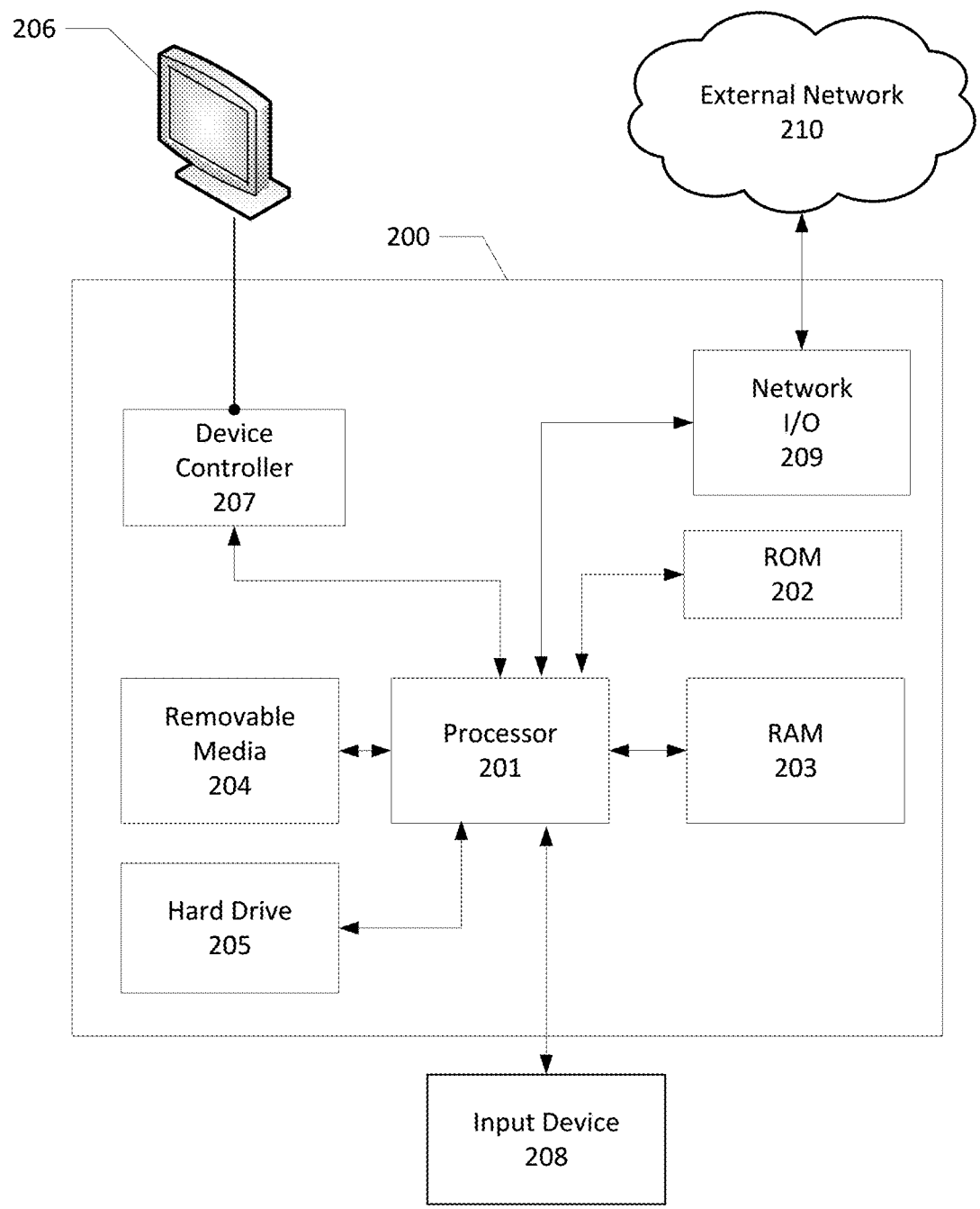
FIG. 2 shows an example user device.

FIG. 2 shows an example user device on which various elements described herein can be implemented. The user device 200 may include one or more processors 201, which may execute instructions of a computer program to perform any of the features described herein. The instructions may be stored in any type of computer-readable medium or memory, to configure the operation of the processor 201. Instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, and/or any other desired electronic storage medium. Instructions may also or alternatively be stored in an attached (or internal) hard drive 205. The user device 200 may include one or more output devices, such as a display 206 (or an external television), and may include one or more output device controllers 207, such as a video processor. There may also be one or more user input devices 208, such as a remote control, a keyboard, a mouse, a touch screen, a microphone, etc. The user device 200 may also include one or more network interfaces, such as input/output circuits 209 (such as a network card) to communicate with an external network 210. The network interface may be a wired interface, a wireless interface, or a combination of the two. The interface 209 may include a modem (e.g., a cable modem), and network 210 may include the communication links and/or networks shown in FIG. 1, or any other desired network. The user device 200 may be or include the gateway 111 of FIG. 1.

Figure 3:
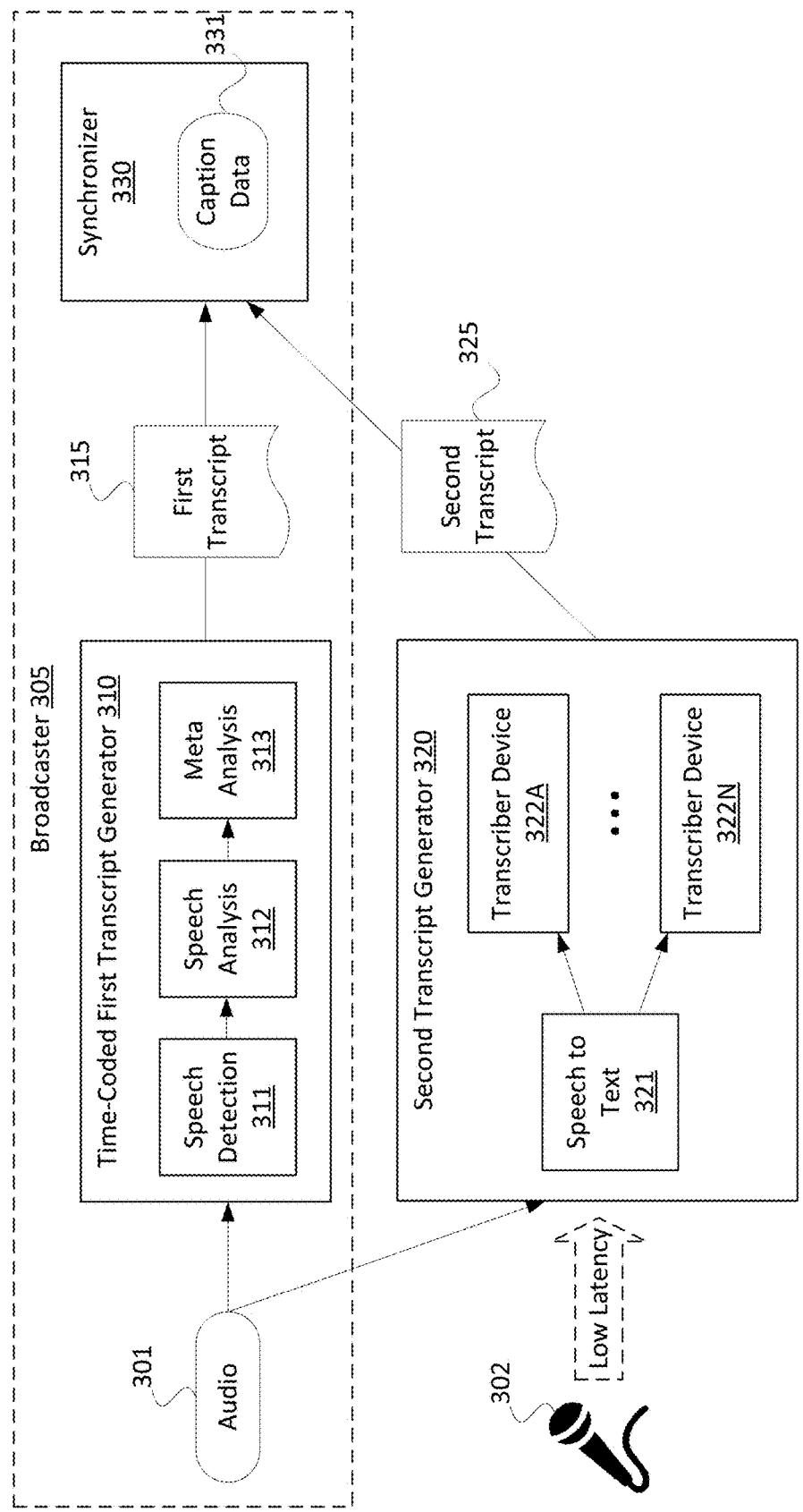
FIG. 3 shows an example data flow for generating captions based on audio.

FIG. 3 shows an example data flow for generating a first transcript including time-coded information and a second transcript. In the data flow of FIG. 3, the first transcript 315 and the second transcript 325 may be generated and synchronized to generate the caption data 331. The first transcript 315 may be generated by a computing device at a first location, such as a time-coded first transcript generator 310 at a broadcaster 305. The second transcript 325 may be generated using one or more computing devices, such as a second transcript generator 320, at a second location different from the first location. The second transcript may be generated by one or more humans using the one or more computing devices and/or automatically (e.g., by software running on the one or more computing devices). Additionally or alternatively, the first transcript 315 and the second transcript 325 may be generated by one or more computing devices at the same location.

The time-coded first transcript generator 310 may receive audio 301 (e.g., audio data, which may be contained within audio content, video content, or other media content) and generate the first transcript 315 associated with the audio 301. The time-coded first transcript generator 310 may be a component of a broadcaster 305. The broadcaster may implement the time-coded first transcript generator 310 using one or more computing devices, which may be at a broadcaster location. The time-coded first transcript generator 310 may be configured to perform speech detection 311, speech analysis 312, and/or meta analysis 313 in order to generate the first transcript 315 of the audio 301.

During speech detection 311, the time-coded first transcript generator 310 may determine whether the audio 301, or parts of the audio 301, contains speech. During the speech analysis 312, the time-coded first transcript generator 310 may analyze the audio 301, or parts of the audio 301 containing speech, to determine information about the speech in the audio 301, such as one or more words or phonemes contained in speech of the audio 301. The time-coded first transcript generator 310 may determine one or more timecodes for parts of speech (e.g., words, phonemes, etc.). During the meta analysis 313, the time-coded first transcript generator 310 may determine meta information about the audio 301, or parts of the audio 301 containing speech, such as a sentiment of the speech (e.g., whether a speaker is angry, scared, happy, etc.), an accent of the speech, a language of the speech, a location or distance of the speech, whether the speech is part of a media item (e.g., whether the speech is lyrics of a song), and the like. The time-coded first transcript generator 310 generates the first transcript 315, which contains the speech information with associated timecodes. The first transcript 315 may further contain meta information about the speech and associated timecodes. Further details of an example method for generating the first transcript 315 are described below with respect to FIG. 4.

The audio 301 may also be received by a second transcript generator 320, which may generate a second transcript of the audio 301. The second transcript generator 320 may perform speech to text 321 processing that generates an initial transcript of the audio 301. The second transcript generator 320 may use one or more transcriber devices 322 to generate the second transcript 325 (e.g., from scratch or based on the initial transcript generated by the speech to text 321). The second transcript generator 320 may select one of the outputs generated by the transcriber device(s) 322 as the best (e.g., most accurate) output to yield the second transcript and/or may combine portions of the outputs generated by the transcriber device(s) 322 to yield the second transcript. Further details of an example method for generating a second transcript 325 are described below with respect to FIG. 5.

The second transcript generator 320 may receive low-latency audio 302 instead of or in addition to the audio 301. During a live broadcast (e.g., of a sports event), the low-latency audio 302 may be received from a microphone (e.g., of a sports announcer) over a low-latency transmission path, which may reduce the amount of time for the low-latency audio 302 to reach the second transcript generator 320 and thus allow generation of the transcript(s) during a delay before transmission of the live content (e.g., during a tape delay or other time delay). The second transcript generator 320 may be located nearby a live event (e.g., in the same building), in order to further reduce the latency of the low latency connection for receiving the low-latency audio 302. Accordingly, the second transcript generator 320 may generate the second transcript from the low-latency audio 302 instead of or in addition to the audio 301.

The time-coded first transcript generator 310 may transmit the first transcript 315 to the synchronizer 330, and the second transcript generator 320 may transmit the second transcript 325 to the synchronizer 330. Additionally or alternatively, third, fourth, or even more transcript generators (not shown) may generate additional transcripts and send them to synchronizer 330. The synchronizer 330 may then generate the caption data 331 based on both the first transcript 315 and the second transcript 325 (as well as any additional transcripts that may be received from additional transcript generators). The synchronizer 330 may match one or more words of the second transcript 325 to one or more words or phonemes of the first transcript 315, and use the associated timecodes of the words or phonemes of the first transcript 315 to generate the caption data 331. The caption data 331 may include one or more words of the second transcript 325 associated with matching timecodes of the first transcript 315. Further details of an example method for synchronizing the first transcript 315 with the second transcript 325 to generate the caption data 331 are described below with respect to FIG. 4.

Figure 4:
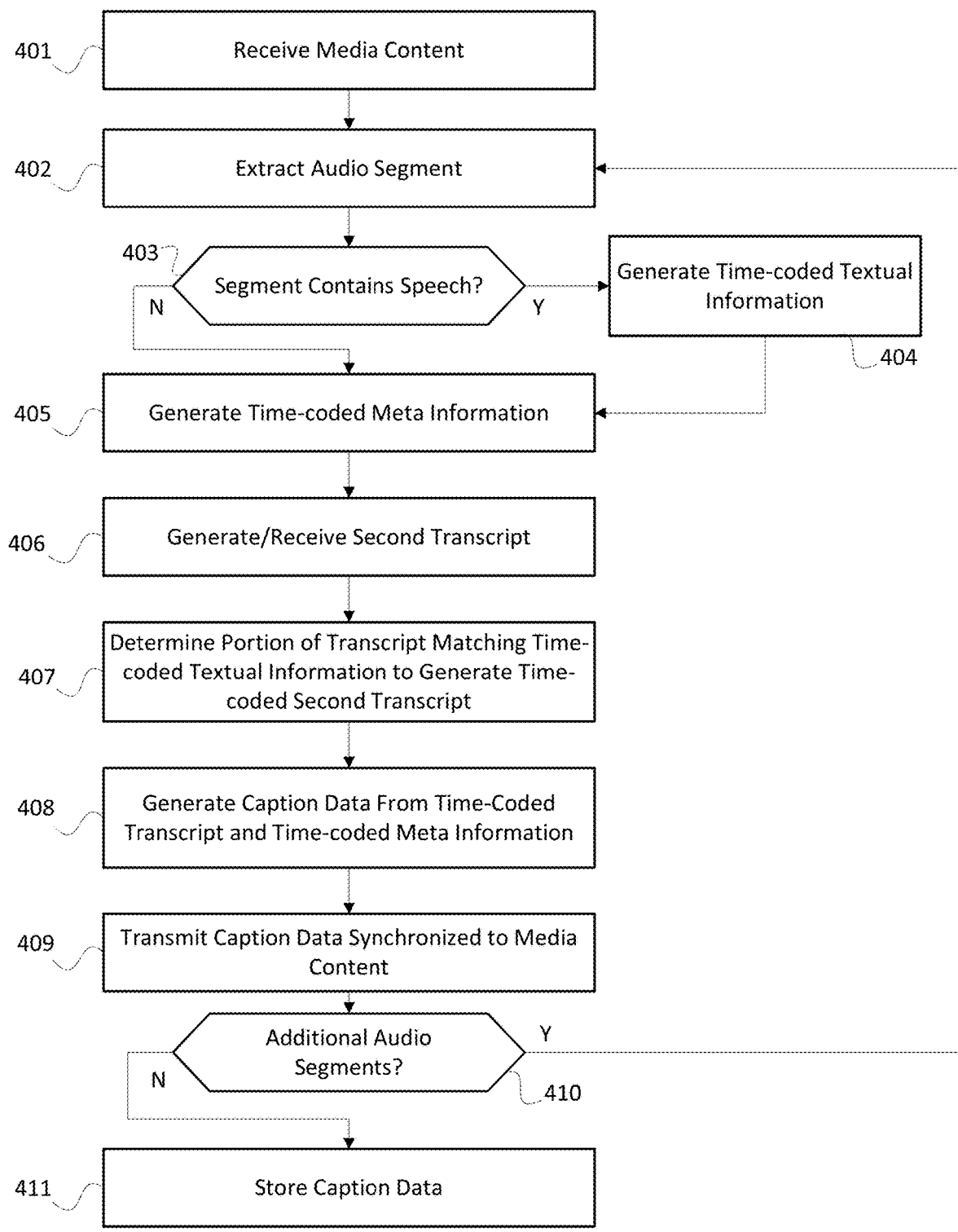
FIG. 4 shows steps in an example method for generating captions based on audio.

FIG. 4 shows an example method for generating and transmitting the caption data 331. The example method of FIG. 4 may be performed by one or more computing devices of the broadcaster 305, such as an application server 107, which may implement one or more of a time-coded first transcript generator 310, a second transcript generator 320, and/or a synchronizer 330.

At step 401, a computing device (e.g., application server 107 implementing one or more of the time-coded first transcript generator 310, the second transcript generator 320, and/or the synchronizer 330) may receive media content for transcription. The media content may be a video program (e.g., a television show, movie, or other video content) or other source of video stored locally and/or received via a network. The media content may comprise a live video feed received from a sporting event or other live event. Additionally or alternatively, the media content may be a movie or television program received and stored for future streaming to a user (e.g., after receiving a user request for the movie or television program). Additionally or alternatively, the media content may be an audio program, such a song, audiobook, podcast, or other audio content. The media content may contain one or more audio tracks.

At step 402, the computing device may extract an audio segment from the media content. The computing device may perform audio segmentation to divide the media content into one or more audio segments. The audio segments may include a portion of audio, such as one or more sentences of speech, one or more sound effects, an audio track (e.g., one of multiple audio tracks), or another portion of an audio component of the media content. The computing device may divide the audio into segments based on one or more volume characteristics of the audio, frequency characteristics of the audio, track information, and/or based on timing information. The computing device may divide audio into segments based on pauses in speech or other sound (e.g., based on the volume being below a threshold level for a certain period of time), such that segments begin and/or end at natural pauses between speech or other sound effects. Additionally or alternatively, the computing device may divide audio segments based on a change in a frequency and/or volume characteristic, which may indicate a change in who is speaking within the audio content. Additionally or alternatively, an audio segment may be divided based on a maximum time elapsing, such that audio segments may not exceed the maximum time (e.g., 30 seconds).

The computing device may extract audio segments based on metadata included in an audio component of the media content. Some audio formats, such as DOLBY ATMOS and other positional and/or 3D audio formats, may assign portions of audio to objects that may have associated location information. Thus audio associated with a first audio object may be designated as a first audio segment, audio associated with a second audio object may be designated as a second audio segment, and the like.

Additionally or alternatively, the computing device may avoid segmenting the audio, and perform the example method of FIG. 4 on an entire audio component of a media content (e.g., such that the audio segment contains the entire audio). Additionally or alternatively, the audio segment may comprise the most-recently received audio (e.g., the last 3 seconds for live content). Audio segments may be non-overlapping or overlapping (e.g., using a sliding window).

At step 403, the computing device may determine whether the audio segment contains speech or not. The computing device may use a speech to text algorithm to generate a text output based on the audio segment. The computing device may then analyze the text output to determine whether it reflects human speech. The computing device may compare words of the text output to a dictionary to determine if one or more words of the text output are not in the dictionary. If too many (e.g., above a threshold number, which may vary based on the length of the audio segment such that longer audio segments may be associated with a higher threshold number) words of the text output do not appear in the dictionary, the computing device may determine that the audio segment does not contain speech.

Additionally or alternatively, the computing device may perform a grammar check on the text output to determine whether the text output contains grammar errors. If the text output contains too many grammar errors (e.g., above a threshold number, which may vary based on the length of the audio segment such that longer audio segments may be associated with a higher threshold number), the computing device may determine that the audio segment does not contain speech.

Additionally or alternatively, the computing device may analyze the audio segment for volume, frequency, and/or other characteristics that indicate human speech. The computing device may use trained models or other machine learning and/or statistical techniques to detect speech based on volume, frequency, and/or other characteristics of the audio.

At step 404, responsive to a determination in step 403 that the audio segment contains speech, the computing device may generate time-coded textual information based on one or more time codes associated with the media content and/or audio segment. The time-coded textual information may include the text output of a speech to text method executed at step 403 and/or may include a separate method for generating textual information from the audio segment. The computing device may execute a speech to phoneme method for generating textual information that indicates phonetic words. Accordingly, textual information may include symbols indicating phonemes. A speech to phoneme method may transcribe the spoken words "peace" or "piece" as the phonetic word "pis," indicating that the speech contains a "p" phoneme, an "i" phoneme, and an "s" phoneme. Additionally, a speech to phoneme method may transcribe the spoken word "peas" as the phonetic word "piz," indicating that the speech contains a "p" phoneme, an "i" phoneme, and a "z" phoneme. Words, letters, phonemes, or other textual information may be associated with a respective time code indicating a time at which the speech corresponding to the textual information occurs within the audio. The computing device may associate a phonetic word with a timecode, and/or a phoneme of the phonetic word with a timecode.

At step 405, the computing device may generate time-coded meta information from the audio segment. The computing device may analyze the audio information to generate meta information based on the content of the audio information.

If the audio segment contains speech (e.g., as determined at step 403), the computing device may generate meta information indicating an identity of the speaker. The computing device may generate a voice print (e.g., a set of characteristics that identify a voice) from the audio containing speech and compare it one or more voice prints generated from previous audio segments. If the voice prints match, computing device may generate meta information identifying the speaker using an anonymous identifier (e.g., "Speaker 1" or "Speaker 2") or a name. The computing device may store one or more names associated with voice prints and use the names to identify the speaker. If an audio segment contains multiple speakers (e.g., as indicated by varying volume or frequency characteristics), the computing device may generate multiple voice prints. The computing device may generate meta information identifying the multiple speakers based on the multiple voice prints. The computing device may associate the meta information with one or more time codes indicating a time (and/or range of time) in the media content at which the audio corresponding to the meta information occurred.

Additionally or alternatively, the computing device may analyze the audio to determine a relative volume of a speech or sound. The computing device may generate time-coded meta information characterizing the audio as being loud, quiet, average volume, or other such designations. The computing device may associate the meta information with one or more time codes indicating a time (and/or a range of time, e.g. using start and end time codes) in the media content at which the audio corresponding to the meta information occurred. The computing device may generate a plurality of volume information corresponding to different sounds of the audio segment.

Additionally or alternatively, the computing device may analyze the audio to determine a location associated with speech or other sound. If available, the computing device may extract and use location information that is already present in metadata of the media content. Audio streams in some formats (e.g., DOLBY ATMOS) may include location information associated with an audio object. The computing device may extract the location information from the metadata and generate time-coded meta information indicating the location. The computing device may also or alternatively estimate location information based on comparing multiple audio tracks to each other. If a sound occurs in a right channel of stereo audio a few milliseconds before a similar sound occurs in a left channel of stereo audio, the computing device may determine that a position of the sound is towards the right. Based on comparing multiple audio tracks of surround sound (e.g., DOLBY 5.1) audio to each other, the computing device may determine that a sound is behind and to the left (e.g., based on a sound first occurring in a rear and/or left channels). The computing device may generate meta information indicating a location of a sound effect, speech, or other sound in an audio segment. The computing device may associate the meta information with one or more time codes indicating a time (and/or a range of time, e.g., using start and end time codes) in the media content at which the audio corresponding to the meta information occurred. The computing device may generate a plurality of location information corresponding to different sounds of the audio segment.

Additionally or alternatively, the computing device may perform a sentiment analysis of audio segments and generate time-coded meta information indicating one or more sentiments. The computing device may use a model trained using machine learning and/or statistical techniques to detect one or more sentiments from audio data. Such a model could also be trained to use text in addition to audio data as an input, such that a speech to text output could be used as input to the model for determining one or more sentiments. The computing device may use such a model to classify the audio segment as indicating sentiments such as anger, happiness, fear, surprise, and the like. The models may further be trained to indicate "no sentiment" for non-speech sounds (e.g., sound effects). The computing device may associate the meta information with one or more time codes indicating a time (and/or a range of time, e.g. using start and end time codes) in the media content at which the audio corresponding to the meta information occurred. The computing device may generate a plurality of sentiment information corresponding to different sounds of the audio segment.

Additionally or alternatively, the computing device may analyze video information (e.g., using object recognition techniques) to generate object information identifying one or more objects appearing on screen. For example, the computing device may feed frames of video into an image recognition model and generate the object information from the output of the image recognition model. Such object information may be later used to enhance or modify caption information, as further described below.

Responsive to a determination, at step 403 of FIG. 4, that the audio segment contains speech, the computing device may add the time-coded meta information to the time-coded textual information generated at step 404. The time-coded meta information and the time-coded textual information together may make up the first transcript 315. Responsive to a determination that the audio segment does not contain speech, the computing device may provide the time-coded meta information (if any) as the first transcript 315.

At step 406, the computing device may generate and/or receive a second transcript, which may be generated according to the example method of FIG. 7, as further described below. The second transcript may be generated by another device (e.g., at a different location) and received by the computing device performing the method of FIG. 4. The second transcript may contain words that reflect speech in the audio as well as certain meta information. The second transcript may include an indication of which speaker was speaking (e.g., the speaker's name).

At step 407, the computing device may perform a synchronization method to correlate the first transcript 315 to the second transcript 325 in order to associate the time codes of the first transcript 315 with the words of the second transcript 325. The computing device thus generates a time-coded second transcript 335 comprising words of the second transcript 325 and time codes of the first transcript 315.

If the first transcript contains a phonetic phrase such as "ə pis əgrimənt," and the second transcript contains the phrase "a peace agreement," the computing device may detect a match between the two phrases. To detect a match, the computing device may first convert the second transcript 325 to a phonetic equivalent, then compare the phonemes of the first transcript 315 to the phonemes of the phonetic equivalent of the second transcript 325. The computing device may detect a phrase match based on some or all of the phonemes of the two phrases being the same.

After detecting a phrase match, the computing device may tag the words of the second transcript with the time codes from the matching words of the first transcript. If the phonetic word "pis" is associated with a first time code, the computing device may tag the matching second transcript word "peace" with the first time code based on the match. Similarly, if the phonetic word "ə'grimənt" is associated with a second time code, the computing device may tag the matching second transcript word "agreement" with the second time code.

The computing device may also or alternatively detect phrase matches based on close (e.g., not exact) matches. If the phonetic equivalent of the second transcript contains the phonetic word "pis," and the first transcript contains the phonetic word "piz," the computing device may detect a match. The computing device may determine a number or percentage of the phonemes of corresponding words or phrases that are exact matches (the "p" phoneme and the "i" phoneme are exact matches, so ⅔ of the corresponding words' phonemes are exact matches). The computing device may further determine a similarity score between phonemes that do not exactly match. An "s" phoneme and a "z" phoneme may have a similarity score of 0.8 (e.g., on a scale of zero to one) based on the two phonemes having similar sounds. The computing device may retrieve, from a stored list or matrix including similarity scores between given pairs of phonemes, such a similarity score. The computing device may detect a match between phonetic words based on a number or percentage of phonemes that are exact matches and/or based on the similarity score between phonemes that are not exact matches. Thus, a first rule may indicate a match if at least 25% of phonemes match exactly and an average similarity score between non-matching phonemes is at least 0.6. A second rule may indicate a match if at least 75% of phonemes match exactly and an average similarity score between non-matching phonemes is at least 0.4. The computing device may detect a phrase match if either the first rule or the second rule indicates a match.

Phrases may include multiple words or a single word. The computing device may initially attempt to find a match for a relatively long phrase (e.g., a phrase including all of the textual information generated at step 404 for the audio segment). If the computing device cannot find a match for the entire phrase, it may split the phrase into sub-phrases, then attempt to find matches for the sub-phrases as described above. The matching and sub-dividing method may repeat iteratively until some or all (e.g., above a threshold percentage) of phrases have a match and/or the phrases have been sub-divided to a minimum level (e.g., a word, a minimum number of phonemes, etc.). The computing device may thus synchronize the first transcript 315 and second transcript 325 and generate a time-coded second transcript 335 therefrom.

At step 408, the computing device may generate caption data based on the time-coded second transcript 335 and any time-coded meta information. The caption data may include the words of the second transcript together with metadata including timing information and other metadata. The caption data may be formatted using various caption formats. Some caption formats may include a timestamp at speaker changes as well as periodically within a speaker's monolog. Some caption formats may include a start time and an end time associated with one or more words that will be displayed from the start time until the end time. Some caption formats may include a timestamp for each word. The computing device may convert the time-coded second transcript 335 into any caption format.

The computing device may use the time-coded meta information to modify the formatting and/or text of the caption. The time-coded meta information may be used to modify formatting for captions having timing information that corresponds to the particular time-coded meta information. The computing device may use the time-coded meta information indicating a speaker identification to modify corresponding caption text to indicate who is speaking (e.g., a caption may begin with a name of the speaker, as follows: "[Speaker Name]: [caption text]"). Additionally or alternatively, the computing device may format caption text to use a particular font size, style, color, or other font attribute corresponding to a first speaker, and another particular font size, style, color, or other font attribute for caption text corresponding to a different speaker. Additionally or alternatively, the computing device may modify a font size, style, color, or other attribute of caption text based on a corresponding sentiment indicated in the time-coded meta information (e.g., increasing a font size to show anger). Additionally or alternatively, the computing device may insert characters in the caption to indicate a corresponding sentiment (e.g., exclamation points, emojis, words describing the sentiment, and the like). The computing device thus generates captions including formatted caption text and timing information in a caption format. Additionally or alternatively, a caption may be modified with object information (e.g., if the caption indicates "screeching" and the object information indicates that a car is on-screen, the caption may be modified to indicate "tires screeching" or similar based on the recognized object).

The computing device may also generate, based on the time-coded meta information, caption metadata for the generated caption data. The computing device may embed location information with the caption data that causes the caption to be displayed at a certain location in the media content. The location information may include location information (e.g., coordinates) that causes display of the caption at a particular location within associated video content, and/or may include location information (e.g., "to the right") that causes display of the caption at a particular location on a display screen (e.g., on the right side of the display screen).

At step 409, the computing device may transmit the generated captions (including any caption metadata) synchronized with the media content. For live media content, the broadcaster may use a time delay (e.g., 5 seconds) between receiving the live media content and transmitting the media content, which gives the computing device time to generate the captions and synchronize them to the transmitted live media content. The received media content may contain time codes and/or the broadcaster may generate time codes for the received media content. The computing device may then use the caption time codes to transmit the captions at the correct time in synchronization with the media content based on the time codes within the transmitted media content. The caption data may be transmitted ahead of the corresponding media content, and a receiving device may use the time codes embedded in the captions to display the captions at the correct time in synchronization with the media content.

At step 410, the computing device may determine whether there are additional audio segments to extract. If the computing device is receiving and generating captions for live media content, the computing device may wait until additional live media content has been received before repeating steps 402-409. If the computing device is retrieving stored media content, it may extract a next audio segment and then repeat steps 403-409 until it has finished generating captions for the entire stored media content.

At step 411, responsive to determining that there are no additional audio segments (e.g., because a live media content is over, captions have been generated for an entire stored media content, or the like) the computing device may store the caption data and/or the media content. The computing device may retrieve and transmit the caption data in synchronization with a subsequent transmission of the corresponding media content.

Figure 5:
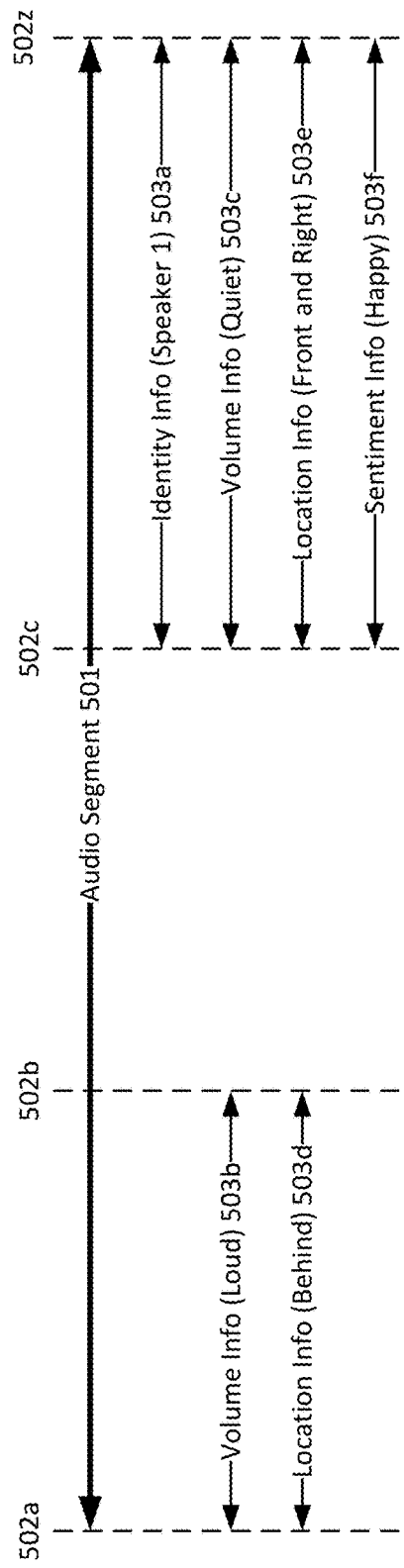
FIG. 5 shows an example audio segment with corresponding meta information.

FIG. 5 shows metadata associated with time codes (e.g., as generated at step 405, described above). A timeline for an audio segment 501 (or a portion of an audio segment 501) includes a beginning time code 502*a* and an ending timecode 502*z*. A computing device (e.g., the computing device that executes the example method of FIG. 4) may generate identity information 503*a* indicating that a first speaker is speaking at a particular time range within the audio segment, as shown by the arrow corresponding to identity information 503*a*. The computing device may determine a beginning time code 502*c* and an ending time code 502*z* for the identity information 503*a*. The time codes may be determined based on audio analysis (e.g., volume and/or frequency characteristics of the audio) and/or based on the time-coded textual information, which indicates when speech occurs. The time codes may also be determined based on other meta information. In FIG. 5, if volume information 503*c* (discussed below) was already generated before identify information 503*a* was generated, the computing device could reuse the beginning and ending timecodes of volume information 503*c* for identity information 503*a*. In connection with audio segment 501, the computing device may avoid attempting to generate an identity for a sound associated with meta information 503*b*, 503*d* because of a lack of time-coded textual information corresponding to the sound, indicating that the sound is not speech.

The computing device may generate volume information 503*b* indicating that a loud sound occurs in a portion of the audio segment. Similarly, the computing device may generate volume information 503*c* indicating that a quiet sound occurs in a different portion of the audio segment. The computing device may determine respective beginning time codes 502*a*, 502*c* and respective ending time codes 502*b*, 502*z* for the volume information 503*b* and 503*c*. The time codes may be determined based on audio analysis (e.g., volume and/or frequency characteristics of the audio) and/or based on the time-coded textual information, which indicates when speech occurs. The time codes may also be determined based on other meta information. If identity information 503*a* was already generated before volume information 503*c* was generated, the computing device could reuse the beginning and ending timecodes of identity information 503*a* for volume information 503*c*.

The computing device may generate location information 503*d* indicating that a sound occurs in a "behind" direction in a portion of the audio segment. Similarly, the computing device may generate location information 503*e* indicating that a sound occurs in a "front and right" direction in a different portion of the audio segment. The computing device may determine respective beginning time codes 502*a*, 502*c* and respective ending time codes 502*b*, 502*z* for the location information 503*d* and 503*e*. The time codes may be determined based on audio analysis (e.g., volume and/or frequency characteristics of the audio) and/or based on the time-coded textual information, which indicates when speech occurs. The time codes may also be determined based on other meta information. If identity information 503*a* was already generated before location information 503*e* was generated, the computing device could reuse the beginning and ending timecodes of identity information 503*a* for location information 503*e*.

The computing device may generate sentiment information 503*f* indicating a sentiment in a portion of the audio segment. The computing device may determine a beginning time code 502*c* and an ending time code 502*z* for sentiment 503*f*. The time codes may be determined based on audio analysis (e.g., volume and/or frequency characteristics of the audio) and/or based on the time-coded textual information, which indicates when speech occurs. The time codes may also be determined based on other meta information. In FIG. 5, if identity information 503*a* was already generated before sentiment information 503*f* was generated, the computing device could reuse the beginning and ending timecodes of identity information 503*a* for sentiment information 503*f*. In FIG. 5, the computing device may avoid attempting to generate a sentiment for a sound associated with meta information 503*b*, 503*d* because of a lack of time-coded textual information corresponding to the sound, indicating that the sound is not speech.

Figure 6:
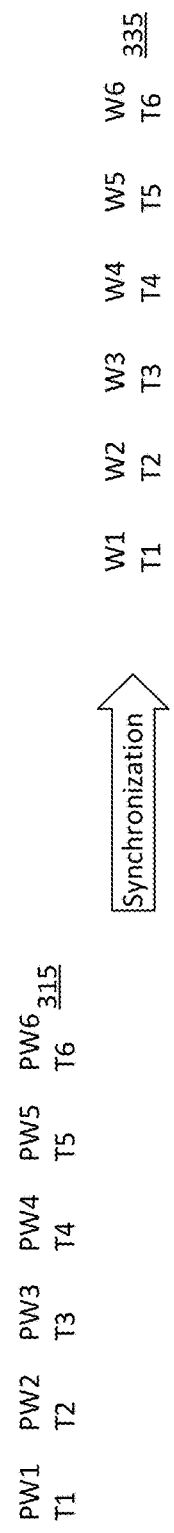
FIG. 6 shows an example synchronization of information to generate accurate captions.

Referring to FIG. 6, the first transcript 315 may contain a series of phonetic words PW1-PW6. The words may be associated with a respective timecode T1-T6. The second transcript 325 may contain a series of words W1-W6. The synchronization method (e.g., as described at step 407 above) matches the words W1-W6 of the second transcript 325 to equivalent or similar words (e.g., phonetic words PW1-PW6) of the first transcript 315 in order to associate the time codes T1-T6 with the words W1-W6, as shown by the time-coded second transcript 335 of FIG. 6. The synchronization method may operate by matching individual words and/or by matching phrases comprising several words. (e.g., matching a phrase comprising words W1-W3 to a phrase comprising phonetic words PW1-PW3).

If the computing device cannot find a match for the phrase comprising PW1-PW6, the computing device may split the phrase into two phrases PW1-PW3 and PW4-PW6, then attempt to find a match for the two phrases. Additionally or alternatively, the computing device may split a phrase containing multiple sentences and/or clauses into phrases containing individual sentences and/or clauses, then attempt to find a match for the sub-phrases. This method may be performed iteratively for phrases that do not have matches (e.g., further splitting the phrases until they contain single words).

The computing device may interpolate the results of the matching to find matches for unmatched phrases. In FIG. 6, if a first phrase PW1-PW2 matches a corresponding phrase W1-W2, and a third phrase PW4-PW6 matches a corresponding phrase W5-W6, then the computing device may determine that an unmatched second phrase PW3-PW4 appearing between the first and third phrases matches a corresponding phrase W3-W4. In this way, the computing device may find and assign, from the first transcript, time codes for some or all of the words of the second transcript based on matches of nearby words and/or phrases.

The computing device may interpolate or extrapolate time codes for words that do not have time codes based on the results of the matching (e.g., because no matching phonetic word was found). If a first word W1 is associated with a time code T1 with a value of 1:01 (e.g., indicating the word occurred one minute and one second from the beginning of the audio), and a third word W3 is associated with a time code T3 with a value of 1:03, then the computing device may generate a time code T2 with a value of 1:02 for a second word W2 appearing between the first and third words. The computing device may thus interpolate the value of a second timecode from the values of the first and third timecodes (e.g., by averaging). Additionally, if a first word W1 is associated with a time code T1 with a value of 1:01, a second word W2 is associated with a time code T2 with a value of 1:01, and a third word W3 is associated with a time code T3 with a value of 1:02, then the computing device may generate time codes for fourth and fifth words W4, W5 that do not have time codes and that appear after the third word. The computing device may extrapolate a time code T4 with a value of 1:02 for the fourth word W4, and a time code T5 with a value of 1:03 for the fifth word W5 (e.g., based on linear extrapolation from the values of the nearby first, second, and third time codes T1-T3).

Figure 7:
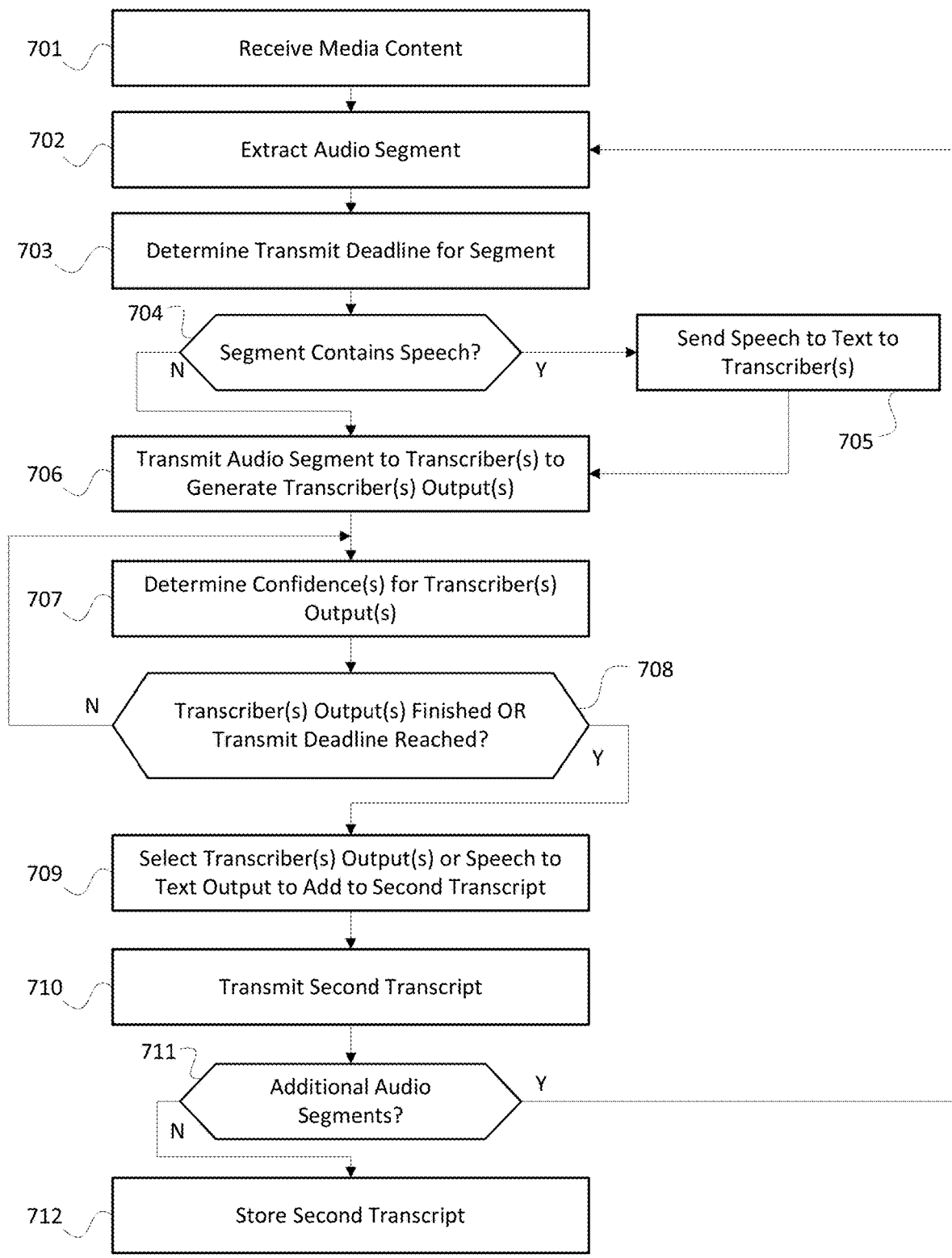
FIG. 7 shows steps in an example method for generating a transcript of audio.

FIG. 7 shows an example method for generating a second transcript, which may be used by the computing device performing the example method of FIG. 4 (e.g., if the computing device generates the second transcript at step 406 of FIG. 4) or by another computing device (e.g., if a separate device implements the second transcript generator 320 and the computing device performing the example method of FIG. 4 receives the second transcript at step 406 of FIG. 4). The example method of FIG. 7 may be performed by one or more remote computing devices at a separate location from the broadcaster. For a live event, the remote computing device(s) may generate the second transcript at the site of the live event (e.g., at a stadium or arena of a sporting event). Additionally or alternatively, a centralized remote computing device implementing the second transcript generator 320 may generate transcripts for a plurality of broadcasters, who may be clients of a transcript generation service.

At step 701, the one or more computing devices implementing the second transcript generator 320 may receive media content, which may be or include audio content for transcription. The media content may be received from the broadcaster and/or directly from an audio source via a low-latency connection. By receiving content via a low latency connection, the second transcript generator 320 may be able to use additional time and/or implement a guaranteed minimum time for generating the second transcript before the live content is broadcast. For a live event (e.g., a sporting event), the one or more computing devices may receive audio via a low latency connection from a microphone of an event announcer, sportscaster, player, or other audio source. The low latency connection may be an analog audio connection, a low latency digital audio connection such as S/PDIF, a digital connection capable of carrying low latency digital signals, such as Ethernet, or some other low latency connection, and may use various protocols such as real-time transport protocol (RTP), DANTE, or some other low latency protocol.

At step 702, the one or more computing devices may extract an audio segment from the media content. The one or more computing devices may perform audio segmentation to divide the media content into one or more audio segments. Audio segments may include a portion of audio, such as one or more sentences of speech, one or more sound effects, an audio track, or another portion of an audio component of the media content. The one or more computing devices may divide the audio into segments based on one or more volume characteristics of the audio, frequency characteristics of the audio, track information, and/or based on timing information. The one or more computing devices may divide audio into segments based on pauses in speech or other sound (e.g., based on the volume being below a threshold level for a certain period of time), such that segments begin and/or end at natural pauses between speech or other sound effects. Additionally or alternatively, the one or more computing devices may divide audio segments based on a change in a frequency and/or volume characteristic, which may indicate a change in who is speaking within the audio content. Additionally or alternatively, the one or more computing devices may divide an audio segment based on a maximum time elapsing, such that audio segments may not exceed the maximum time (e.g., 30 seconds). For live content, the maximum time of an audio segment may be set to be some fraction of a live transmission delay (e.g., less than 2.5 seconds for a 10-second transmission delay).

At step 703, the one or more computing devices may determine a transmit deadline for the audio segment. The transmit deadline may be used when captions are being generated in real time (e.g., for live media content). The transmit deadline may specify a time by which the second transcript should be generated and/or transmitted in order to have enough time to generate and transmit captions with the media content. If a broadcaster transmits live content on a five second delay, the transmit deadline may be set for four seconds after receipt of the audio segment, which may provide enough time to generate captions for transmission with the media content. If the captions are not being generated in real time, the transmit deadline may be set to a null value, a value far in the future, or some other value signifying that the transmit deadline is not a constraint.

At step 704, the one or more computing devices may determine if the audio segment contains speech. The one or more computing devices may first use a speech to text algorithm to automatically generate a text output based on the audio segment. The one or more computing devices may then analyze the text output to determine whether it reflects human speech. The one or more computing devices may compare words of the text output to a dictionary to determine if one or more words of the text output are not in the dictionary. If too many (e.g., above a threshold number, which may vary based on the length of the audio segment such that longer audio segments may be associated with a higher threshold number) words of the text output do not appear in the dictionary, the one or more computing devices may determine that the audio segment does not contain speech. Additionally or alternatively, the one or more computing devices may perform a grammar check on the text output to determine whether the text output contains grammar errors. If the text output contains too many grammar errors (e.g., above a threshold number, which may vary based on the length of the audio segment such that longer audio segments may be associated with a higher threshold number), the one or more computing devices may determine that the audio segment does not contain speech. Additionally or alternatively, the one or more computing devices may analyze the audio segment for volume, frequency, and/or other characteristics that indicate human speech. The one or more computing devices may use trained models or other machine learning and/or statistical techniques to detect speech based on volume, frequency, and/or other characteristics of the audio.

At step 705, the one or more computing devices may transmit a speech to text output to one or more transcriber devices to serve as an initial version of a transcript. One or more transcribers (which may be human transcribers using the transcriber devices and/or translation software executing on the transcriber devices, as further discussed below) may use the speech to text output as a reference and/or perform corrections on the speech to text output to generate a second transcript.

At step 706, the one or more computing devices may transmit the audio segment to one or more transcriber device(s), which may present the audio segment and/or the speech to text to the transcriber(s) to generate a transcriber output. Some or all of the transcribers may be human transcribers. The human transcribers may use stenographic machines, computers, or other transcriber devices to generate the transcriber outputs.

Additionally or alternatively, some or all of the transcribers of step 706 may be algorithms. The one or more computing devices may implement and use one or more commercially available speech to text algorithms to generate transcriber outputs. Additionally or alternatively, the one or more computing devices may store and execute one or more trained models (e.g., recurrent neural networks or other deep learning or statistical models) to recognize speech. The model and/or algorithm may output a confidence score indicating a confidence in the accuracy of its corresponding transcriber output.

At step 707, the one or more computing devices may determine a confidence for some or all of the transcriber output(s), which may influence which transcriber output is added to the second transcript. As stated above, some transcribers may be configured to generate a confidence score, and others may not. Therefore, the one or more computing devices may determine a confidence score for some or all of the transcriber outputs that do not already have a confidence score.

The one or more computing devices may determine a confidence score for a human transcriber based on several factors, including how long the transcriber took to generate the transcriber output, whether the transcriber output has one or more grammar or spelling errors, whether the transcriber re-typed the transcriber output or otherwise changed his/her mind (e.g., by typing, selecting a backspace or delete function, and retyping), whether the transcriber selected a confirm function before the transmit deadline was reached, a known accuracy of the transcriber, and/or based on a selection or input by the transcriber indicating a confidence level (e.g., the transcriber may input a numerical or other value indicating a confidence level). The presence of spelling or grammar errors may tend to indicate a lower confidence level. Additionally or alternatively, taking a longer time to generate the transcriber output may tend to indicate a lower confidence level. Additionally or alternatively, a determination that the transcriber re-typed the transcriber output may tend to indicate a higher confidence level. Selecting a confirm function may tend to indicate a higher confidence level. Further, a known accuracy of the transcriber may tend to reduce or increase the confidence level based on whether the known accuracy is low or high respectively. A transcriber may be tested to determine a known accuracy.

The one or more computing devices may determine a confidence score for an automatic transcriber based on several factors, such as whether the transcriber output has one or more grammar or spelling errors and/or a known accuracy of the automatic transcriber.

At step 708, the one or more computing devices may determine that some or all (e.g., a majority) of the transcriber outputs are finished, or that the transmit deadline has been reached (in which case the one or more computing devices may stop waiting for additional transcriber outputs, and proceed to step 709). The one or more computing devices may determine that the condition of step 708 is satisfied if more than a threshold number or percentage of the transcriber outputs have been received. When the condition of step 708 is satisfied, the example method proceeds to step 709.

At step 709, the one or more computing devices may select one or more transcriber outputs as a best (e.g., most accurate) transcriber output(s), which may be added to the second transcript. The one or more computing devices may select one or more transcriber outputs based on the confidence levels corresponding to the transcriber outputs and/or based on comparing the transcriber outputs to each other. If the highest-confidence transcriber outputs all match, those transcriber outputs may be determined to be correct and added to the second transcript. If the highest-confidence transcriber output contains a first string of text, and the second-fifth highest-confidence transcriber outputs all contain a second string of text, the one or more computing devices may add the second string of text to the second transcript because of the numerous matches. Accordingly, the selection of one or more transcriber outputs as the best output(s) may be based on confidence scores and/or matches between transcriber outputs.

The one or more computing devices may generate an output for the second transcript containing different portions of different transcriber outputs. If a first group of transcriber outputs all contain a matching first word of a string, and a second group of transcriber outputs all contain a matching second word of the string, the one or more computing devices may generate a second transcript that includes the first word and the second word, even if no transcriber output contained both the first word and the second word. Therefore, the one or more computing devices may generate the second transcript from portions of various transcriber outputs.

If the transcribers generate transcripts of multiple overlapping audio tracks, the one or more computing devices may select the best transcriber output from among the multiple overlapping audio tracks. For example, in some audio tracks, speech may be muffled or quiet, and accordingly transcriber outputs for such audio tracks may be low confidence or vary greatly among transcribers. However, the same speech may be more clear on another audio track, and the transcriber outputs may be correspondingly higher confidence and/or have less variation between transcribers. The one or more computing devices may compare the transcriber outputs across the overlapping audio tracks to determine if they are transcriptions of the same audio, and select the best transcriber output for the second transcript from only one of the audio tracks. This comparison may beneficially allow the display of the best quality captions, even when the user has selected not to output a particular audio track (e.g., if a user has selected a first video feed and a corresponding first audio track, the displayed captions may be generated based on audio from a second audio track that is not selected, because the second audio track has higher quality audio).

The one or more computing devices may send the best transcriber output back to the transcriber device(s) for feedback and training purposes (e.g., at a later time). Human transcribers may review the best transcriber output in comparison to their generated transcriber output in order to learn from their mistakes and improve their transcriber outputs. Automated transcribers may store the best transcriber output as a training sample, which may be used to retrain a speech recognition model or otherwise improve the transcription software.

At step 710, the one or more computing devices may transmit some or all of the second transcript. The one or more computing devices may transmit the newly-generated portions of the second transcript to another device, component, or process (e.g., a device, component, or process implementing the example method of FIG. 4, in order to provide the transcript for step 406 of FIG. 4). Additionally or alternatively, the one or more computing devices may transmit the entire updated second transcript to the another device, component, or process.

At step 711, the one or more computing devices may determine if there are any additional audio segments to transcribe. If the one or more computing devices are receiving and transcribing live media content, the one or more computing devices may wait until additional live media content has been received before repeating steps 702-710 to add additional portions to the second transcript. If the one or more computing devices are retrieving stored media content, the one or more computing devices may extract a next audio segment and then repeat steps 703-710 until the one or more computing devices have finished transcribing the entire stored media content.

At step 712, the one or more computing devices may store the second transcript. The one or more computing devices may later retrieve the stored second transcript upon demand if a broadcaster requests the stored second transcript.

Figure 8:
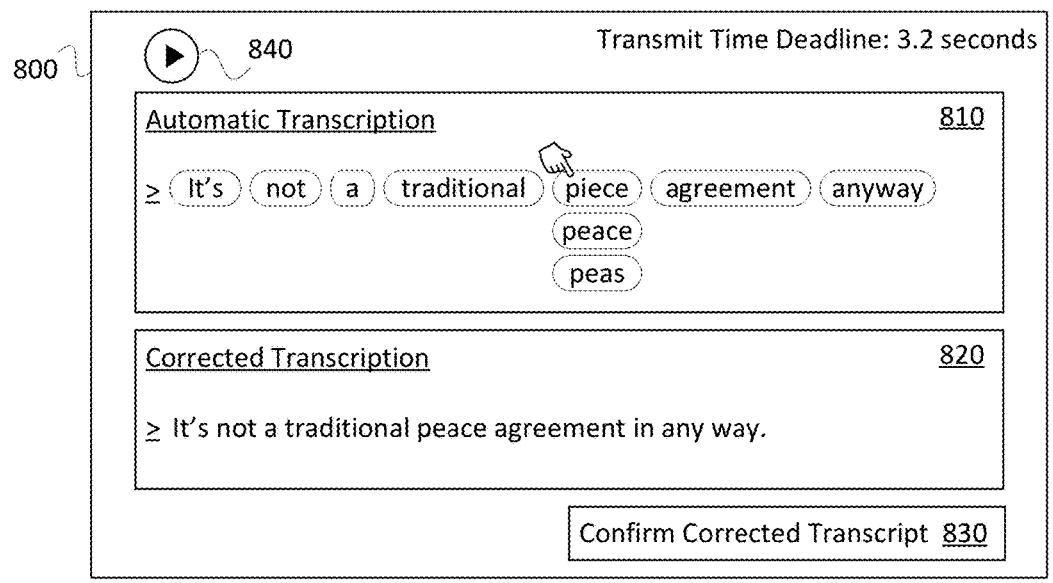
FIG. 8 shows an example user interface for manually correcting a transcript.

FIG. 8 shows an example graphical user interface 800 that may be displayed by a transcriber device, and may allow a transcriber to generate a transcriber output by correcting a speech to text output (e.g., according to step 706 of FIG. 7). A first area 810 of the graphical user interface 800 may present a speech to text output or other initial transcript of an audio segment. A second area 820 of the graphical user interface 800 may present a transcriber output. Selection of a button 840 may cause playback of the audio segment corresponding to the initial transcript. The transcriber may interact with the first area 810 or second area 820 to correct the initial transcript to generate the transcriber output. A transcriber may listen to the audio segment and then select (e.g., using a touchscreen interface, a stenographic keyboard, a keyboard and/or mouse, or other selection device) one or more words of the initial transcript to correct the one or more words. A transcriber may select a word to view and select replacement words that are phonetically the same or similar. In FIG. 8, if a transcriber selects the word "piece," the graphical user interface 800 presents the phonetically same word "peace" and the phonetically similar word "peas." The transcriber may select the alternate word "peace" to cause the transcriber output to update accordingly. Additionally or alternatively, if the transcriber selects a word, the graphical user interface 800 may suggest a replacement of multiple words that are phonetically the same or similar (e.g., replacing the single word "anyway" with "any way"). Additionally or alternatively, transcribers may add, delete, or modify words directly using input devices such as keyboards, stenographic keyboards, or other input devices. When the transcriber is finished correcting the initial transcript, the transcriber may select a confirm 830 function to finish the transcriber output. The transcriber device may subsequently display another speech to text output and/or play back another audio segment so the transcriber can generate a transcriber output of another audio segment.

Graphical user interface 800 may display a transmit time deadline (e.g., as a countdown indication). If the transmit time deadline is reached before the transcriber selects a confirm function 830, the transcriber device may use the transcriber output or discard the transcriber output. The transcriber device may subsequently display another speech to text output and/or play back another audio segment so the transcriber can generate a transcriber output of another audio segment. The user interface may further include a confirm function 830 for confirming that a transcript has been corrected.

Captions of the caption data 331 may be displayed by a receiving device or a display device as an overlay over media content. The receiving device may display the captions as an overlay at a location of the media content that corresponds to a source of the associated audio. If the caption metadata included with the captions includes location information, the receiving device may display an associated caption over a location in the media content that matches the location information. The location information may indicate that a caption should be displayed at a certain location on a display screen (e.g., a left side of the screen, a bottom center portion of the screen, a right side of the screen, etc.). Additionally or alternatively, the location information may include position information for displaying the caption data at a particular location within the media content (e.g., at particular coordinates corresponding to the media content).

Figure 9A:
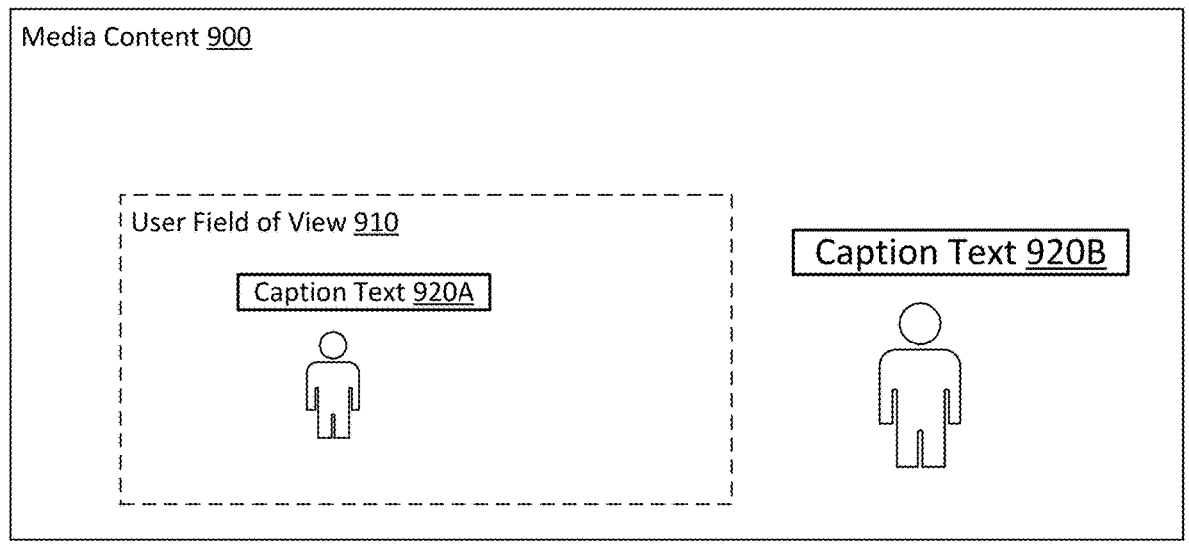
FIGS. 9A-9C shows an example display for displaying captions for content with an interactive field of view.

FIG. 9A shows an example display of captions together with interactive media content in which a user's field of view is limited to less than the entirety of the media content. While viewing interactive media content (e.g., virtual reality media content, video game content, or the like), a user may only see a portion of the media content at one time, and may interactively change the user's field of view. Therefore, a caption with associated location information may be associated with a location within the media content that is outside of a user's field of view. In FIG. 9A, a user's field of view 910 contains a first character and first caption containing first caption text 920A. A second caption containing a second caption text 920B is associated with a location outside the user's field of view, according to location information associated with the second caption (e.g., coordinates that place the caption near a second character). Because the second caption is outside the user's field of view 910, the user does not see the second caption.

Figure 9B:
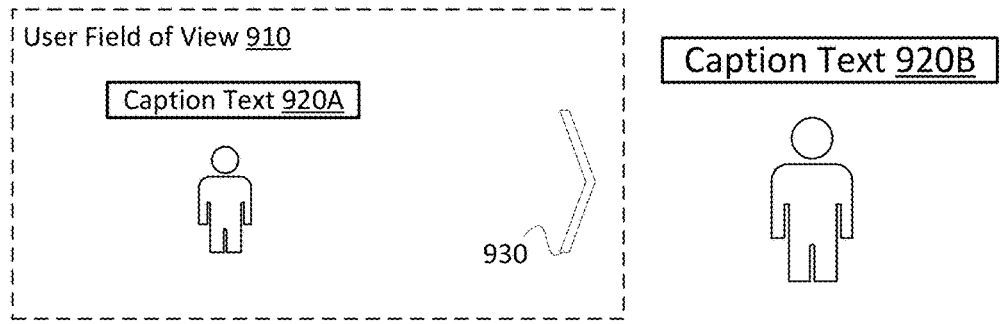

FIG. 9B shows an example display alerting a user that a caption location is outside the user's field of view 910. If a caption is outside the user's field of view 910, the receiving device may display an offscreen caption indicator 930 within the user's field of view 910. The offscreen caption indicator 930 indicates that a user may adjust the field of view 910 to see an offscreen caption. The receiving device may display the offscreen caption indicator 930 at a location that indicates how the user may adjust the field of view 910 to see the corresponding caption. If the caption is located to the right of the user field of view 910, the receiving device may display the offscreen caption indicator 930 at a right edge of the user field of view 910.

Figure 9C:
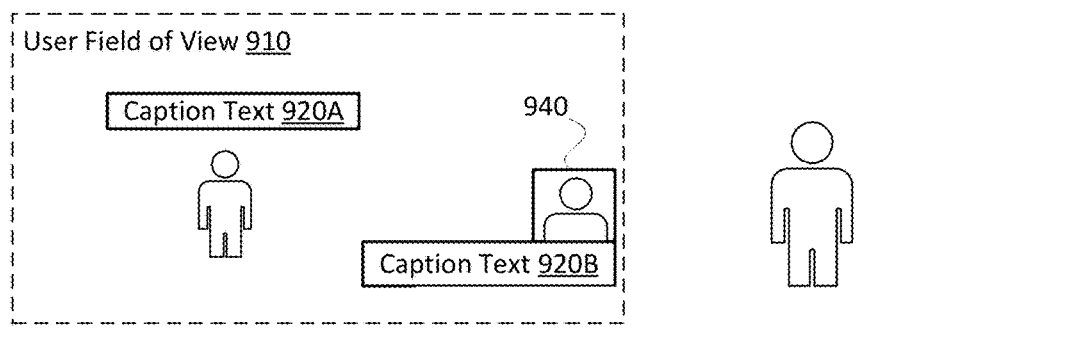

FIG. 9C shows an example display of a caption related to a character that is located outside a user's field of view 910. Instead of or in addition to displaying an offscreen caption indicator 930, the receiving device may relocate a caption with a location outside the user's field of view 910 so that the relocated caption is displayed within the user's field of view 910. The receiving device may relocate a caption with caption text 920B from a position next to a second character to a position within the user's field of view 910. The relocated position may indicate the direction of the original position. If the original position was to the right of the user's field of view 910, the relocated position may be on the right edge of the user's field of view 910. Accordingly, a user viewing the caption will know that by adjusting the field of view in the direction of the relocated caption, the field of view will encompass the original location and the caption may be displayed in its original position (e.g., next to a corresponding character).

The receiving device may cause display of the relocated caption together with a thumbnail 940. The thumbnail 940 may contain an inset portion of the media content 900 near the original caption location that is outside the user's field of view 910. If the original caption location was nearby a particular character, the thumbnail 940 may display the media content containing the particular character, which the user would otherwise miss because the media content containing the particular character is outside the user's field of view 910.

Figure 10:
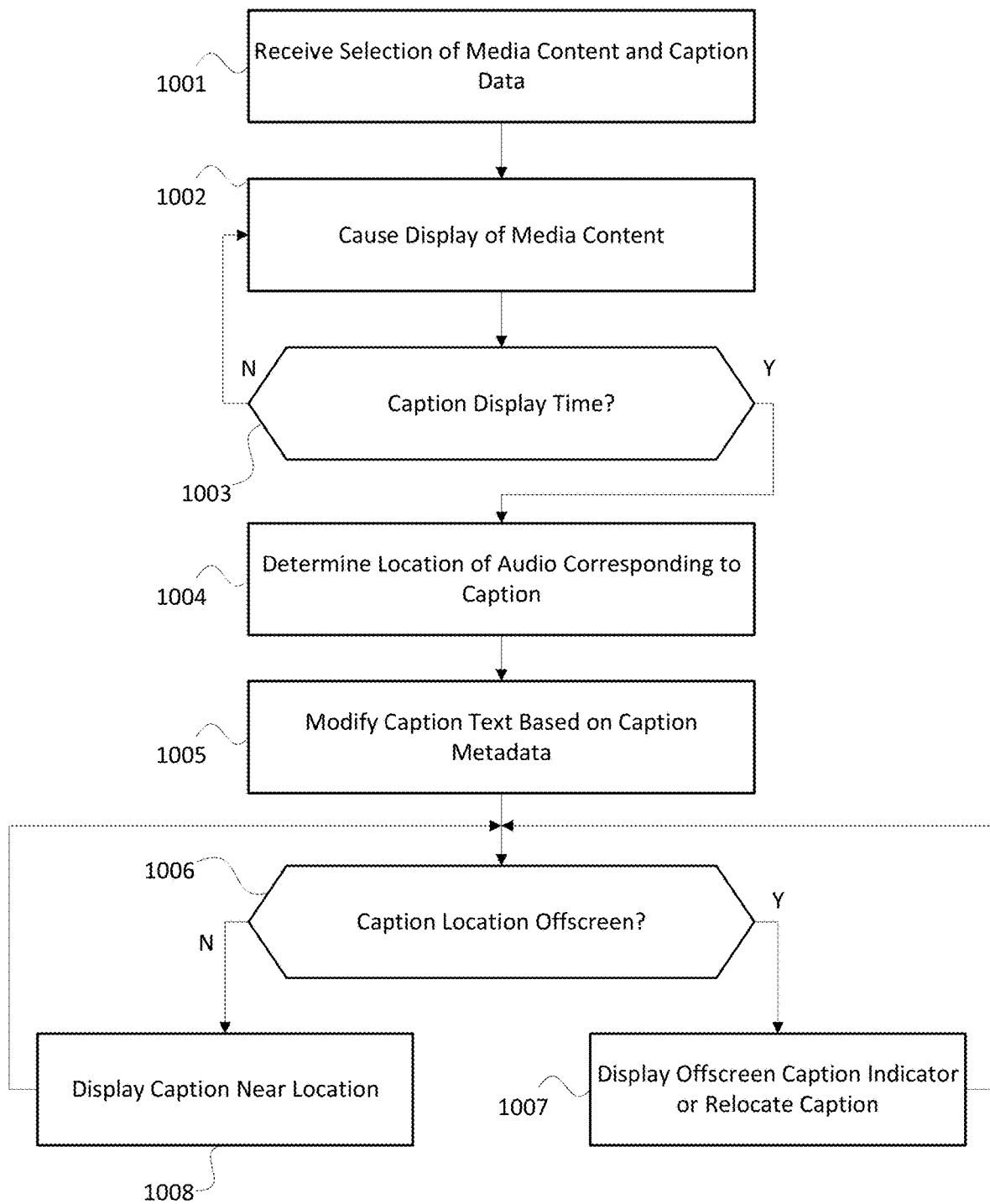
FIG. 10 shows steps in a method for displaying captions for content with an interactive field of view.

FIG. 10 shows an example method for displaying caption data for interactive media content. At step 1001, a receiving device (e.g., a set top box, smart television, mobile device, or other media device) may receive a selection of media content and/or caption data. A user may select the media content and/or caption data via a user interface. Additionally or alternatively, the media content and/or caption data may be selected by the receiving device (e.g., according to a default setting).

At step 1002, the receiving device may cause display of the media content. The receiving device may request the media content from an on-demand server, tune to a broadcast of the media content, retrieve the media content from storage, or otherwise receive the media content, and may output the media content to a display. The receiving device may additionally format the caption data for display and cause the display to display the caption data as part of the media content (e.g., as an image overlay on or within the media content).

At step 1003, the receiving device, while causing display of the media content, may continually and/or repeatedly determine whether to display caption data at a current time. The receiving device may compare timestamp information within the caption data to a current time or playback time of the media content to determine when to display caption data.

The receiving device may modify timestamps for received captions and/or display captions at times before or after the times corresponding to the caption timestamps. For example, when a volume is muted or turned down, the receiving device may be less concerned with ensuring playback synchronization, and may speed up or slow down caption display based on the amount of text to display in captions. For example, when a relatively large amount of caption data is scheduled for display in a relatively short amount of time (e.g., because characters are speaking rapidly, multiple characters are speaking, the captions include background or expository information, and/or the like), the receiving device may display some of the captions earlier than indicated by the timestamp, and some of the captions later than indicated by the timestamp, in order to "spread out" the textual information, thus giving viewers time to read all of the captions without feeling rushed. Thus the receiving device may analyze frequency of captions (e.g., based on spacing or intervals between caption timestamps) and amount of caption data in order to determine whether a relatively large amount (e.g., more than a threshold number of words, lines, sentences, or the like) of caption text is scheduled for display on the screen at a time, and modify the display of the captions accordingly.

If the timestamp information indicates caption data for display, at step 1004, the receiving device may determine location information associated with the caption data. The receiving device may extract such location information from caption metadata contained within the caption data. The location information may comprise coordinates for displaying the caption data within the media content.

At step 1005, the receiving device may format the caption text of a caption based on caption metadata. The receiving device may increase or decrease a font size (e.g., from a default size) in response to caption metadata indicating that audio associated with the caption is relatively loud or quiet. Additionally or alternatively, the receiving device may modify the caption text to use a particular font, color, and/or style to indicate a caption associated with a particular character, as indicated by the caption metadata.

At step 1006, the receiving device may determine whether a caption location is offscreen (e.g., because the caption location is outside of a user field of view). The receiving data may compare location coordinates associated with a caption to the current field of view. If the caption location is offscreen, at step 1007, the receiving device may display an offscreen caption indicator (e.g., as shown in FIG. 9B) and/or relocate the caption to be onscreen (e.g., as shown in FIG. 9C). If the caption location is not offscreen, the receiving device may cause display of the caption at the corresponding location. After causing display of the caption according to one of steps 1007 or 1008, the example method loops back to decision 1006, such that the receiving device displays the caption according to one of steps 1007 or 1008 based on any updates to the interactive user field of view.

One or more aspects of the disclosure may be stored as computer-usable data and/or computer-executable instructions, such as in one or more program modules, executed by one or more computers or other devices. Program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, and/or other types of media. The functionality of the program modules may be combined or distributed as desired. Additionally or alternatively, the functionality may be implemented in whole or in part in firmware or hardware equivalents such as integrated circuits, field programmable gate arrays (FPGA), application-specific integrated circuits (ASIC), and/or other types of hardware and/or firmware. Particular data structures may be used to more implement one or more operations disclosed herein, and such data structures are contemplated within the scope of computer executable instructions and computer-usable data described herein.

Modifications to the disclosed methods, apparatuses, and systems may be made by those skilled in the art, particularly in light of the foregoing teachings. The features disclosed herein may be utilized alone or in combination or subcombination with other features. Any of the above described systems, apparatuses, and methods or parts thereof may be combined with the other described systems, apparatuses, and methods or parts thereof. The steps shown in the figures may be performed in other than the recited order, and one or more steps may be optional. It will also be appreciated and understood that modifications may be made without departing from the true spirit and scope of the present disclosure.

What is claimed is:

1. A method comprising:
   determining a first transcript of an audio portion of media content, wherein the first transcript comprises timing information synchronizing first words of the first transcript with the media content;
   based on a correlation between first words of the first transcript and second words of a second transcript of the audio portion, determining an updated second transcript that comprises timing information synchronizing the second words, of the second transcript of the audio portion, with the media content; and
   determining, based on the updated second transcript, caption data associated with the media content.

2. The method of claim 1, wherein the first words are associated with a first plurality of phonetic elements, and wherein the second words are associated with a second plurality of phonetic elements.

3. The method of claim 1, wherein the first transcript further comprises location information associated with a sound occurrence, wherein determining the first transcript comprises determining, based on analyzing the audio portion, the location information.

4. The method of claim 1, wherein determining the caption data further comprises determining metadata indicating a first location for displaying, within the media content, a first caption of the caption data.

5. The method of claim 1, wherein the first transcript further comprises metadata indicating at least one of a sentiment associated with the audio portion, a speaker identification associated with the audio portion, a volume associated with the audio portion, or object information associated with the audio portion, and wherein determining the caption data further comprises modifying, based on the metadata, one or more of formatting associated with the caption data or text associated with the caption data.

6. The method of claim 1, wherein determining the updated second transcript comprises at least one of:
   receiving the second transcript;
   generating, based on audio received via a low-latency transmission path, the second transcript; or
   generating, based on a plurality of transcriber outputs, the second transcript.

7. The method of claim 1, wherein the correlation between the first words of the first transcript and the second words of the second transcript comprises:
   a determination of timing information associated with one or more of the first words of the first transcript; and
   an association of one or more of the second words of the second transcript with the timing information based on phonetic elements of the one or more of the first words matching phonetic elements of the one or more of the second words.

8. The method of claim 1, wherein the second transcript comprises one of a computer-generated transcript of the audio portion or a human-generated transcript of the audio portion.

9. The method of claim 1, wherein the correlation between the first words of the first transcript and the second words of the second transcript of the audio portion comprises:
   a determination that an extra word of the second transcript that is absent from the first transcript;
   a determination of an overlapping word that is present in both the second transcript and the first transcript, wherein the overlapping word is adjacent to the second words; and
   a determination, based on a first time code associated with the overlapping word, of a second time code associated with the extra word of the second transcript.

10. The method of claim 1, wherein the correlation is based on a determination that an average similarity score between non-matching words of the first words and the second words satisfies a threshold.

11. The method of claim 1, further comprising:
    sending the media content and the caption data.

12. A method comprising:
    determining a first phrase that is present in both a first transcript and a second transcript of an audio portion of media content, wherein the first transcript comprises timing information synchronizing first words of the first transcript with the media content;
    updating, based on a first time code associated with the first phrase in the first transcript, the second transcript to associate a second time code with a second phrase, in the second transcript, that is absent from the first transcript;
    determining, based on the second phrase, caption data associated with the audio portion of the media content; and
    sending the media content and the caption data.

13. The method of claim 12, further comprising:
    based on a determination that a quantity of exact matches, between first elements of the first transcript and second elements of the second transcript, satisfies a threshold, correlating timing information associated with the first words of the first transcript with second words of the second transcript.

14. The method of claim 12, wherein the first transcript further comprises location information associated with a sound occurrence, the method further comprising determining, based on analyzing the audio portion, the location information.

15. The method of claim 13, wherein the first elements comprise a first plurality of phonetic elements, and wherein the second elements comprise a second plurality of phonetic elements.

16. The method of claim 13, wherein correlating timing information associated with the first words of the first transcript with second words of the second transcript comprises:
   determining timing information associated with one or more of the first words of the first transcript; and
   associating one or more of the second words, of the second transcript, with the timing information based on one or more of the first elements matching one or more of the second elements.

17. The method of claim 12, further comprising determining the second transcript, wherein determining the second transcript comprises at least one of:
   receiving the second transcript;
   generating, based on audio received via a low-latency transmission path, the second transcript; or
   generating, based on a plurality of transcriber outputs, the second transcript.

18. The method of claim 12, wherein updating the second transcript to associate the second time code with the second phrase comprises interpolating, based on a determination that the second phrase is between the first phrase and a third phrase, in the second transcript, the second time code.

19. The method of claim 12, wherein updating the second transcript to associate the second time code with the second phrase comprises determining that the first phrase is adjacent to the second phrase in the second transcript.

20. A system comprising:
   a sending device comprising:
      one or more first processors; and
      first memory storing first instructions that, when executed by the one or more first processors, cause the sending device to:
         determine a first transcript of an audio portion of media content, wherein the first transcript comprises timing information synchronizing first words of the first transcript with the media content;
         based on a correlation between first words of the first transcript and second words of a second transcript of the audio portion, determine an updated second transcript that comprises timing information synchronizing the second words, of the second transcript of the audio portion, with the media content; and
         determine, based on the updated second transcript, caption data associated with the media content; and,
   a receiving device comprising:
      one or more second processors; and
      second memory storing second instructions that, when executed by the one or more second processors, cause the receiving device to display the media content and captions of the caption data.

21. The system of claim 20, wherein the second instructions, when executed by the one or more second processors, cause the receiving device to display the captions of the caption data by displaying the captions at corresponding locations, within the media content, indicated by the caption data.

22. The system of claim 20, wherein the second instructions, when executed by the one or more second processors, cause the receiving device to display the media content by:
   displaying a portion of the media content corresponding to an interactive field of view;
   determining that a first location associated with a first caption is outside the interactive field of view; and
   displaying an overlay indicating that the first location is outside the interactive field of view.

23. The system of claim 20, wherein the second instructions, when executed by the one or more second processors, cause the receiving device to display the media content by displaying an overlay that comprises text of a first caption and an indication that a location of the first caption is outside an interactive field of view.

24. The system of claim 20 wherein the first instructions, when executed by the one or more first processors, cause the sending device to correlate the first words and the second words based on a determination that an average similarity score between non-matching words of the first words and the second words satisfies a threshold.

* * * * *